Patented May 16, 1939

2,158,519

UNITED STATES PATENT OFFICE 2,158,519

PRODUCTION OF AROMATIC ALDEHYDES

Walter Christian Meuly, New Brunswick, N. J., assignor to E. I. du Pont de Nemours & Company, Wilmington, Del., a corporation of Delaware No Drawing. Application April 20, 1938,
Serial No. 203,131

11 Claims. (Cl. 260—599)

This invention relates to the production of aromatic aldehydes, the present application being a continuation-in-part of my copending application Serial No. 112,710, filed November 25, 1936.

More particularly, this invention relates to the production of para-alkyl aldehydes of the general formula

wherein R is an alkyl radical containing from 1 to 8 carbon atoms, or more.

It is an object of this invention to provide a novel and efficient method for preparing aldehydes of the above general formula. It is a further object of this invention to provide a method for the manufacture of para-alkylated aromatic aldehydes which enables one to start with cheap initial materials. Other and further important objects of this invention will appear as the description proceeds.

Para-alkyl benzaldehydes have been previously prepared by applying the Gattermann-Koch aldehyde synthesis to alkyl benzols. This synthesis may be considered as a special case of the Friedel-Crafts synthesis, and consists of reacting together a suitable homolog of benzene with carbon monoxide gas and dry hydrochloric acid in the presence of anhydrous aluminum chloride:

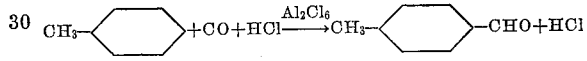

(Annalen 347, 347; 1906; Berichte, 30, 1622; 1897).

This reaction gives a good yield (73%) of p-toluic aldehyde based on the quantity of toluene consumed. It requires, however, a large excess of CO gas, since only about 30% of the CO gas passed through the reaction mass combines with the toluene.

Moreover, in the case of the higher homologs of benzene the situation is much less favorable. Although Gattermann speaks of "good yields" in conjunction with the aldehydes derived from ethyl-benzol and isopropyl-benzol, I have been unable to substantiate these claims in my researches. More particularly, I have run a series of experiments with this reaction as applied to isopropyl-benzene, and followed very carefully the directions given in the Gattermann reaction. The yield of cuminic aldehyde (p-isopropyl-benzaldehyde), however, was very low, being about 14% of theory based on the quantity of isopropyl-benzene consumed. On the other hand over 50% of the isopropyl-benzene was recovered in the form of benzene and of di- and poly-isopropyl-benzenes. By varying the conditions of Gattermann, for instance, by working in a closed vessel at extremely high pressures (800 atmospheres), I have succeeded in stepping up the yield to as high as 18%, but this is still far too low to make the process practical from the commercial viewpoint.

That my experiences above have been shared by others is evident from the fact that although cuminic aldehyde is a valuable perfume intermediate, and therefore in industrial demand, the literature is replete with proposed alternative processes for manufacturing this valuable compound without making use of the direct introduction of the carbonyl group by means of carbon monoxide.

The major difficulty with the Gattermann synthesis, when applied to alkylated benzenes containing an alkyl group with more than one carbon atom, resides in the fact that under the conditions of the Gattermann reaction the alkyl group migrates or is split off completely. As a result, most of the reactants are wasted in the production of di- and polyalkylated benzenes and di- and polyalkylated benzaldehydes with formation of large amounts of benzene. This splitting reaction is not prevented by the addition of benzene as a diluent as has been suggested by Gattermann.

It has also been known that benzene itself (that is, without an alkyl substituent) does not react under the influence of aluminum chloride with carbon monoxide and hydrochloric acid to produce benzaldehyde. This fact was noted by Gattermann, who states:

"The reaction is completely unsuccessful with benzol under the influence of aluminum chloride. This behavior is very desirable because it is thus possible to use benzol as a diluent with such hydrocarbons as are sensitive to aluminum chloride". (Annalen, 347, 347).

I have now found that benzene may be very readily and efficiently converted into cuminic aldehyde or any other optional para-alkyl benzaldehyde, by subjecting it simultaneously to the action of carbon monoxide, anhydrous aluminum chloride and isopropyl chloride or any agent capable of introducing the desired alkyl group. The choice of alkylating agent will of course depend on the nature of the desired alkyl group in para position to the aldehyde group, but aside from this consideration may be any compound which is capable of introducing said alkyl group into benzene under the influence of aluminum chloride while simultaneously liberating hydrogen chloride. This one may employ alkyl halides, alkyl alcohols, alkyl ethers, alkyl borates, or alkyl esters of organic acids (formates, acetates). The test is here whether or not a given compound is capable of condensing with benzene under the influence of aluminum chloride (that is, in the absence of CO) to give an alkyl benzol of the desired type. If it is capable, it is suitable for my novel reaction.

In my parent application above referred to I have indicated as desirable to add hydrogen chloride to the reaction mass, this reactant being fed into the reaction mixture in the form of a dry gas. The present application is concerned primarily with a mode of carrying out my general invention wherein no positive addition of HCl is practiced. I find that the latter step is not essential to my invention, inasmuch as the reaction generally proceeds quite satisfactorily without it. I presume that the explanation of this resides in the fact that alkyl halides, alcohols, alkyl ethers and certain alkyl esters develop HCl during the course of the reaction.

But regardless what the exact explanation of the phenomenon is, it is clear that my present invention constitutes a further improvement on the process of producing aromatic aldehydes of the type hereinabove discussed, inasmuch as it economizes both on materials and labor.

My present improvement is applicable with any alkylating agent which is capable of developing HCl in Friedel-Crafts synthesis. This group of alkylating agents includes alkyl halides and substances which by reaction with anhydrous aluminum chloride produce alkyl chlorides in situ, as illustrated by the following equation using an alkyl ether as an example:

(1)
$$ROR + AlCl_3 \rightarrow 2RCl + AlOCl$$
(2)
$$RCl + C_6H_6 \rightarrow R-C_6H_5 + HCl$$

More specifically, the group of alkylating agents applicable with my present invention comprises:

Alkyl halides, for instance alkyl chlorides, or bromides;
Alcohols;
Dialkyl ethers;
Alkyl esters of weak acids, for instance borates, formates or acetates.

Without limiting my invention to any particular procedure, the following examples are given to illustrate my preferred mode of operation. Parts mentioned are by weight.

EXAMPLE 1

700 parts of benzol, 650 parts of aluminum chloride and 70 parts of cuprous chloride are placed into a vessel provided with agitation. At 25 to 30° C. are gradually introduced during five hours, at ordinary pressure, 240 parts of iso-propyl chloride and 112 parts of carbon monoxide gas. The gas is bubbled through the reaction mass and may be collected after passage for reuse in a future operation.

The reaction mass is poured on ice and separated into its components by suitable methods such as fractional distillation or fractional bisulphitation. Besides unreacted benzol, there are obtained 115 parts of pure cuminic aldehyde, 40 parts of di-isopropyl benzaldehyde, 80 parts of isopropyl benzol, and some di-isopropyl benzol.

The recovered alkyl benzols may be reused in the next operation with the benzol.

EXAMPLE 2

By feeding at ordinary temperature simultaneously carbon monoxide and tertiary-butyl chloride into a mixture of benzol, aluminum chloride and cuprous chloride, p-tertiary-butyl-benzaldehyde is formed, which may be separated from the reaction mass by means of its bisulphite compound. In the pure state, it is a colorless oil; Boiling point at 3.5 mm. of Hg: 91 to 92° C.

EXAMPLE 3

From benzol, carbon monoxide and technical amyl chloride is obtained in a similar manner as described in Example 2, p-tertiary amyl benzaldehyde, characterized by the following constants: boiling point at 5 mm. Hg: 122 to 124° C.; refractive index $n_{20}$: 1.5270; melting point of semi-carbazone: 199 to 200° C.; odor: spicy-sweet and very lasting.

EXAMPLE 4

From cyclo-hexyl-chloride, carbon monoxide and benzol is obtained, in a manner similar to Example 2, p-cyclohexyl-benzaldehyde; boiling point at 2.5 mm. Hg: 126° C.

EXAMPLE 5

From m-methyl-cyclohexyl-chloride, carbon monoxide and benzol is obtained, in an analogous manner, p-(m-methyl-cyclohexyl)-benzaldehyde. In the pure state it is a colorless viscous oil. Boiling point at 1.5 mm. Hg: 110° C.; refractive index $n_{20}$: 1.5490; melting point of semi-carbazone: 215 to 217° C.; possessing an intense and lasting odor of the citrus type.

EXAMPLE 6

*Use of an alcohol as alkylating agent*

Into a mixture of 480 parts of benzol, 400 parts of $AlCl_3$ and 32 parts of $Cu_2Cl_2$ are introduced simultaneously over six hours at ordinary temperature 42 parts of carbon monoxide and 90 parts of isopropanol. The cuminic aldehyde formed may be isolated from the reaction product by means of its bisulphite compound.

EXAMPLE 7

*Use of an ether as alkylating agent*

Into a mixture of 800 parts of benzol, 650 parts of $AlCl_3$ and 60 parts of $Cu_2Cl_2$ are added over several hours simultaneously at 20 to 40° C. 120 parts of carbon monoxide and 204 parts of di-isopropyl ether. Cuminic aldehyde in good yield may be isolated from the reaction mass by fractional distillation or preferably by treatment with sodium bisulphite solution.

EXAMPLE 8

If in Example 7, the 204 parts of di-isopropyl ether are replaced by 300 parts of dicyclohexyl ether, the reaction product is para-cyclohexyl-benzaldehyde.

EXAMPLE 9

500 parts of benzol, 400 parts of aluminum chloride and 40 parts of cuprous chloride are placed into a vessel provided with agitation. 200 parts of tri-isobutyl borate and 100 parts of carbon monoxide gas are then simultaneously fed in over a period of 4 hours, under ordinary pressure and at a temperature of about 40° C. From the reaction product, para-tertiary-butyl-benzaldehyde is obtained in good yield.

It will be understood that my invention is not limited to the precise details given in the above examples, but may vary widely within the spirit of this invention. Thus, the reaction is operative at ordinary pressure from 0° C. to the temperature of boiling benzol (78° C.); although for best results, the range of 10° to 50° C. is preferred. Under pressure, the temperature may be increased above 78° C.

In the above examples, pressures from 1 to 2 atmospheres, absolute, have been employed. There is, however, no limitation to the pressure employed except for the fact that at very high pressures there may occur formation of benzaldehyde simultaneously with the formation of alkyl benzaldehyde.

The relative quantities of reagents employed may vary within wide limits. To assure good yields, the amount of benzol should be at least twice the theoretical amount (two mols benzol for 1 mol carbon monoxide), but it may be much more or less. As for the alkylating agent, best yields are obtained if the same and carbon monoxide are used in about molecular proportions. If the amount of alkylating agent is increased, the main reaction product may be the corresponding dialkyl benzaldehyde. The amount of $AlCl_3$ may vary greatly but for best yield it should be used in at least one molecular proportion for each molecular proportion of carbon monoxide.

The function of the cuprous chloride is catalytic. Its amount, therefore, may vary widely, say from 2 to 20% by weight of the aluminum chloride. It may be replaced by other equivalent catalysts, for instance, cuprous bromide.

The preferred method of mixing the materials consists of adding simultaneously the alkylating agent and the carbon monoxide to a mixture of the benzol, aluminum chloride and catalyst. However, it is possible to add the alkylating agent first.

A number of modifications have been proposed for the Gattermann aldehyde synthesis, all of which may be used in connection with the present process. For instance, nitrobenzol or ortho-nitro-toluol may be added as solvents. Iron chloride or titanium chloride may be present in the $AlCl_3$ or may be added to it.

Among the alkylating agents, this invention is primarily concerned with such as will introduce more than one carbon atom.

The advantages of my invention will now be readily understood.

By the novel method of this invention, it becomes possible to extend the scope of the Gattermann reaction for the introduction of carbon monoxide into the benzol ring. The Gattermann reaction has heretofore been used successfully and commercially, only for such alkyl benzaldehydes as possess side chains of one carbon atom. By the novel process good yields of any alkyl benzaldehydes may be obtained.

The Gattermann reaction starts from alkylbenzols, which are expensive to prepare in all cases where the alkyl group contains two or more carbon atoms. The novel process starts from the inexpensive benzol and inexpensive alkylating agents, such as the alkyl chlorides or alcohols.

As shown previously, the yields of p-alkylated aldehydes are much superior with the novel method for all cases where the alkyl group contains three or more carbon atoms. Thus, not only is the preparation of alkyl-benzol and alkyl benzaldehyde condensed into one step with elimination of the isolation and purification of the alkyl benzol, but the yield of aldehyde is also much improved, which constitutes a further important economic advantage.

Also, in my improved process no hydrogen chloride needs to be fed in, which is a considerable saving in cost of materials and manipulation. In my novel process the reaction of alkylation and that of carbonylation not only run side by side without interfering with each other, but they cooperate with each other in several important respects to produce novel and unexpected effects. Thus the reaction of alkylation seems to furnish the HCl requisite for the carbonylation. The two reactions further cooperate, in some unexplainable manner, to increase in most cases the yield of the desired main reaction product, and to extend the carbonylation reaction to fields where it has hitherto been a practical failure, as is typified by the case of benzol above discussed.

Moreover, my novel process has enabled me to synthesize certain novel aldehydes. Thus, among the compounds synthesized in the above examples the following appear to be novel compounds: p-tertiary-amyl benzaldehyde (Example 3) and p-(m-methyl-cyclohexyl)-benzaldehyde (Example 5). These are useful as perfume materials due to their original and lasting odors.

I claim:

1. The process of preparing a para-alkyl benzaldehyde which comprises reacting upon benzene with an alkylating agent in the presence of aluminum chloride, and further reacting upon the same reaction mass with carbon monoxide, without isolating any intermediate compounds.

2. The process of preparing a para-alkyl benzaldehyde, which comprises reacting upon benzene simultaneously with carbon monoxide and with an agent adapted to introduce an alkyl group, in the presence of aluminum chloride.

3. A process as in claim 1 wherein the alkylating agent is selected from the group consisting of alkyl halides and compounds which are capable of yielding an alkyl halide by reaction with aluminum chloride.

4. A process as in claim 2 wherein the agent adapted to introduce an alkyl group is selected from that group of alkylating agents which are adapted to liberate hydrogen chloride in situ in a Friedel-Craft reaction.

5. The process of preparing a para-monoalkyl benzaldehyde, which comprises reacting upon benzene with carbon monoxide in the presence of aluminum chloride, while simultaneously feeding into the same mass a compound adapted to condense with benzene under the influence of aluminum chloride to give an alkylated benzene while simultaneously liberating hydrogen chloride.

6. The process of preparing a para-mono-alkyl-benzaldehyde, which comprises feeding simultaneously into a mixture of benzene, aluminum chloride and a Gattermann-synthesis catalyst, gaseous carbon monoxide and an alkyl derivative adapted to act as an alkylating agent under the influence of aluminum chloride, while simultaneously liberating hydrogen chloride.

7. A process as in claim 6, the catalyst being a cuprous halide.

8. A process as in claim 6, the catalyst being cuprous chloride.

9. A process as in claim 6, the quantity of alkylating agent passed-in being substantially 1 mol for each 2 mols of benzene, whereby to avoid formation of dialkylated benzaldehyde.

10. A process of producing cuminic aldehyde, which comprises passing simultaneously into a mixture of benzene, aluminum chloride and cuprous chloride, a stream of carbon monoxide gas and an isopropylating agent selected from the group consisting of isopropyl halides, isopropyl alcohol, diisopropyl ether, and isopropyl esters of weak acids.

11. A process of producing cuminic aldehyde, which comprises passing simultaneously into a mixture of benzene, aluminum chloride and cuprous chloride, a stream of carbon monoxide gas and di-isopropyl ether.

WALTER CHRISTIAN MEULY.